(12) United States Patent
Tagawa et al.

(10) Patent No.: US 9,387,990 B2
(45) Date of Patent: Jul. 12, 2016

(54) BELT CONVEYOR

(75) Inventors: Saburo Tagawa, Hyogo (JP); Toyoki Hashimoto, Hyogo (JP)

(73) Assignee: OKURA YUSOKI KABUSHIKI KAISHA, Kakogawa-Shi, Hyogo (JP)

(*) Notice: Subject to any disclaimer, the term of this patent is extended or adjusted under 35 U.S.C. 154(b) by 0 days.

(21) Appl. No.: 14/369,516

(22) PCT Filed: May 24, 2012

(86) PCT No.: PCT/JP2012/063310
§ 371 (c)(1),
(2), (4) Date: Jun. 27, 2014

(87) PCT Pub. No.: WO2013/099317
PCT Pub. Date: Jul. 4, 2013

(65) Prior Publication Data
US 2014/0311876 A1  Oct. 23, 2014

(30) Foreign Application Priority Data
Dec. 29, 2011 (JP) ................. 2011-290287

(51) Int. Cl.
*B65G 23/14* (2006.01)
*B65G 23/02* (2006.01)
*B65G 15/62* (2006.01)

(52) U.S. Cl.
CPC ............. *B65G 23/02* (2013.01); *B65G 15/62* (2013.01)

(58) Field of Classification Search
CPC ........ B65G 23/02; B65G 15/62; B65G 15/64; B65G 47/66

USPC ................................... 198/833, 841
See application file for complete search history.

(56) References Cited

U.S. PATENT DOCUMENTS 4,170,175 A * 10/1979 Conlon, Jr. .................. 346/74.2
4,832,205 A * 5/1989 Backus ......................... 209/620
5,007,528 A 4/1991 Hideharu
5,605,222 A * 2/1997 Huberty et al. ............... 198/841
6,367,619 B1 * 4/2002 Cemke et al. ................. 198/841
6,959,803 B1 * 11/2005 Layne et al. .................. 198/600
7,594,573 B2 * 9/2009 Grabau ......................... 198/841

FOREIGN PATENT DOCUMENTS

CN       1039391 A       2/1990
CN       2092515 U       1/1992
DE    102008024314 A1   11/2009
EP       0406425 A1      1/1991
JP       S57-53407       3/1982

(Continued)

OTHER PUBLICATIONS

International Search Report dated Jun. 19, 2012, from corresponding International Application No. PCT/JP2012/063310.

(Continued)

*Primary Examiner* — William R Harp
(74) *Attorney, Agent, or Firm* — Troutman Sanders LLP

(57) ABSTRACT

A belt conveyor is provided with a circulatable endless conveyor belt for conveying workpieces in a conveying direction. The belt conveyor is also provided with a conveyor body, which has belt receiving end portions that are in sliding contact with the conveyor belt. The belt receiving end portions have recess portions arranged in a direction perpendicular to the conveying direction.

4 Claims, 20 Drawing Sheets

(56) References Cited

FOREIGN PATENT DOCUMENTS

| JP | S60-218208 | 10/1985 |
| JP | H01-68312 | 5/1989 |
| JP | H10-109727 | 4/1998 |
| JP | H10-167441 | 6/1998 |
| JP | 2001-158518 | 6/2001 |

OTHER PUBLICATIONS

Chinese Office Action dated Oct. 26, 2015 issued in corresponding Chinese Patent Application No. 201280061265.1.

Chinese Office Action dated Apr. 17, 2015, which issued during prosecution of Chinese Patent Application No. 201280061265.1.

Chinese Office Action dated Apr. 17, 2015, which issued during prosecution of corresponding Chinese Patent Application No. 201280061265.1.

Extended European Search Report dated Jul. 9, 2015 issued in corresponding European Patent Application No. 12861085.4.

* cited by examiner

BELT CONVEYOR

CROSS-REFERENCE TO RELATED APPLICATIONS

This is a U.S. national phase application under 35 U.S.C. §371 of International Patent Application No. PCT/JP2012/063310, filed on May 24, 2012, and claims benefit of priority to Japanese Patent Application No. JP2011-290287, filed on Dec. 29, 2011. The International Application was published on Jul. 4, 2013, as International Publication No. WO 2013/099317 under PCT Article 21(2). The entire contents of these applications are hereby incorporated by reference.

TECHNICAL FIELD

The present invention relates to a belt conveyor that is capable of reducing frictional resistance received by a conveyor belt.

BACKGROUND ART

An example of conventional belt conveyors is described in PTL 1.

The conventional belt conveyor described in PTL 1 includes a conveyor belt, a conveyor body, and a belt driving means. The conveyor belt is a circulatable endless belt that can be circulated by the belt driving means, thereby conveying workpieces in a conveying direction. The conveyor body has a plate-shaped belt receiving end portion (knife-edge) slidably contacting the conveyor belt. The belt receiving end portion of the conveyor body has at the distal end thereof a belt receiving face, which is in an arc shape without any protrusions or indentations.

CITATION LIST

Patent Literature

PTL 1: Japanese Laid-open Utility Model Publication No. 1-68312

SUMMARY OF INVENTION

Technical Problem

However, the conventional belt conveyor described above presents a problem in that there is the possibility of the conveyor belt receiving great frictional resistance from the belt receiving end portion, because the reverse surface of the conveyor belt is in sliding contact with the belt receiving face of the belt receiving end portion over the entire width of the belt.

In order to solve the above problems, an object of the invention is to provide a belt conveyor that is capable of reducing frictional resistance received by a conveyor belt.

Solution to Problem

A belt conveyor according to an aspect of the present invention includes a circulatable endless conveyor belt that conveys a workpiece in a conveying direction; a conveyor body having a belt receiving end portion that is in sliding contact with the conveyor belt; and a belt driving unit that circulates the conveyor belt. The aforementioned belt receiving end portion has a plurality of recess portions that are arranged in a direction perpendicular to the conveying direction.

According to another aspect of the present invention, each recess portion of the belt receiving end portion of the belt conveyor according to the aspect of the present invention has a heat releasing opening for releasing downward frictional heat generated by sliding friction between the conveyor belt and the belt receiving end portion.

According to yet another aspect of the present invention, the belt receiving end portion of the belt conveyor according to the aspect of the present invention is composed of a single plate-shaped member.

According to a further aspect of the present invention, the belt receiving end portion of the belt conveyor according to the aspect of the present invention is composed of a plurality of plate-shaped members that are arranged in a direction perpendicular to the conveying direction.

According to another further aspect of the present invention, the conveyor body of the belt conveyor according the aspect of the present invention has a head-side belt receiving end portion, which is a belt receiving end portion located at the forward end with respect to the conveying direction; and a tail-side belt receiving end portion, which is a belt receiving end portion located at the rear end with respect to the conveying direction. The head-side belt receiving end portion is provided at the distal end of each respective lateral side thereof with a projecting portion that is outwardly angled in such a manner that, in a planar view, the outermost part of the projecting portion is located at the furthest forward position with respect to the conveying direction. The tail-side belt receiving end portion is provided at the distal end of each respective lateral side thereof with an inwardly slanted portion that is angled in such a manner that, in a planar view, the outermost part of the inwardly slanted portion is located at the furthest forward position with respect to the conveying direction.

According to yet another further aspect of the present invention, the conveyor body of the belt conveyor according to the aspect of the present invention has a head-side belt receiving end portion, which is a belt receiving end portion located at the forward end with respect to the conveying direction; and a tail-side belt receiving end portion, which is a belt receiving end portion located at the rear end with respect to the conveying direction. The head-side belt receiving end portion is provided at the distal end of each respective lateral side thereof with a projecting portion that is outwardly angled in such a manner that, in a planar view, the outermost part of the projecting portion is located at the furthest forward position with respect to the conveying direction. The tail-side belt receiving end portion is provided at the distal end of each respective lateral side thereof with a straight portion extending straight in a direction perpendicular to the conveying direction in a planar view.

Advantageous Effects of Invention

According to the present invention, the belt receiving end portion of the conveyor body has a plurality of recess portions that are arranged in a direction perpendicular to the conveying direction. Therefore, the present invention is capable of reducing the area of the surface of the conveyor belt in sliding contact with the belt receiving end portion, resulting in reduction of the frictional resistance received by the conveyor belt.

DESCRIPTION OF EMBODIMENTS

Figure 1:
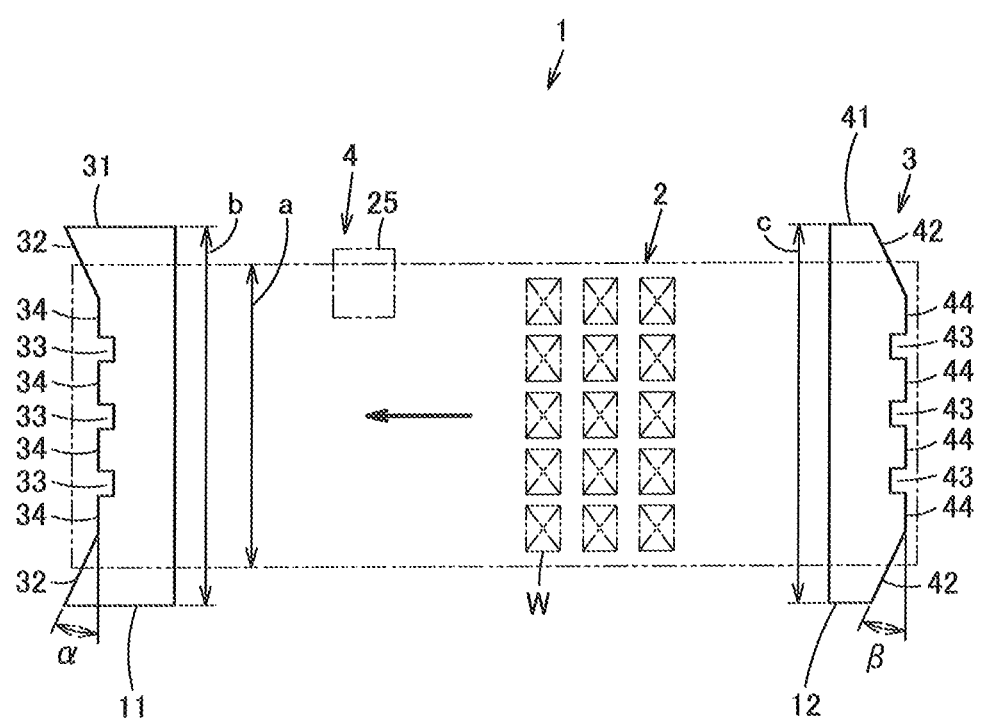
FIG. 1 is a schematic plan view of a belt conveyor according to a first embodiment of the present invention.
Figure 2:
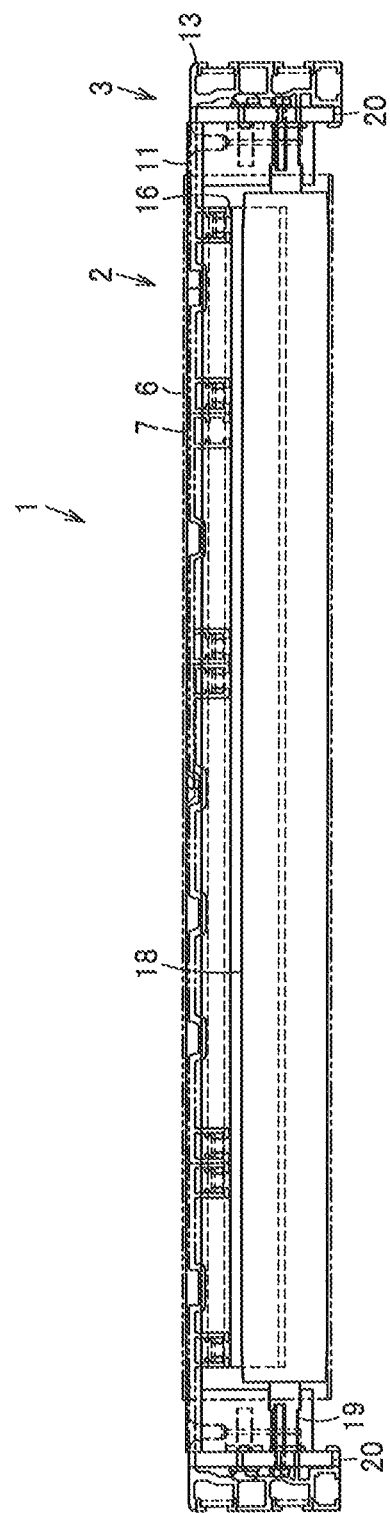
FIG. 2 is a front view of the belt conveyor.
Figure 3:
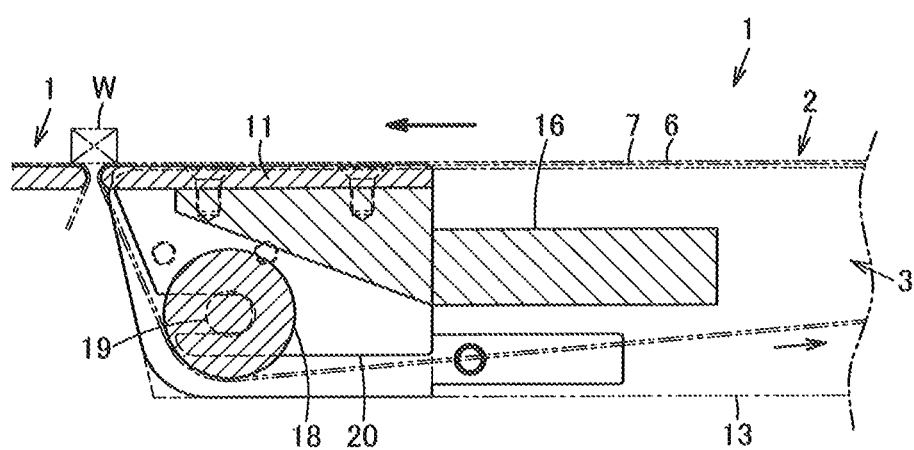
FIG. 3 is a local sectional view of the belt conveyor viewed from a side thereof.

A first embodiment of the present invention is explained hereunder, referring to FIGS. 1 to 9.

Numeral 1 in the drawings denotes a belt conveyor, which is a knife-edge conveyor and is therefore suitable for conveying workpieces W that are typically small articles. In other words, even if the workpieces W are relatively small articles, the workpieces W can be stably transferred from one belt conveyor 1 to another belt conveyor 1 (See FIG. 3).

The belt conveyor 1 has a conveyor belt 2, a conveyor body 3, and a belt driving means 4. The conveyor belt 2 is a circulatable endless belt with a uniform width and serves to convey workpieces W in a horizontal conveying direction. The conveyor body 3 is long in the conveying direction and supports the conveyor belt 2 in such a manner that the conveyor belt 2 can be circulated. The belt driving means 4 is attached to the conveyor body 3 and circulates the conveyor belt 2 in a predetermined direction with respect to the conveyor body 3. Furthermore, the conveyor body 3 is horizontally supported by means of a plurality of legs (not shown).

The conveyor belt 2 is formed of a flexible member with a uniform width "a" and has an outward bound portion 6, the upper surface of which is horizontal and serves as a conveying surface 7 so that workpieces W are placed on the conveying surface 7 and conveyed in the conveying direction. The conveyor belt 2 may be composed of a fabric portion, which is the main body of the belt, and a resin coating portion covering the fabric portion.

The conveyor body 3 has a head-side belt receiving end portion 11 and a tail-side belt receiving end portion 12. The head-side belt receiving end portion 11 is a plate-shaped belt receiving end portion that is located at the forward end of the conveyor body 3 with respect to the conveying direction and is in sliding contact with at least the turnaround portion of the forward end portion, i.e. downstream end portion, of the conveyor belt 2 with respect to the conveying direction. The tail-side belt receiving end portion 12 is a plate-shaped belt receiving end portion that is located at the rear end of the conveyor body 3 with respect to the conveying direction and is in sliding contact with at least the turnaround portion of the rear end portion, i.e. upstream end portion, of the conveyor belt 2 with respect to the conveying direction.

Furthermore, the conveyor body 3 has a frame portion 13, which is long in the conveying direction and supports the outward bound portion 6 of the conveyor belt 2 from below in such a manner as to be in sliding contact with the outward bound portion 6.

The head-side belt receiving end portion (head-side knife-edge) 11 is attached through a head-side mounting plate (edge support) 16 to the forward end with respect to the conveying direction, which is one of the longitudinal ends, of the frame portion 13. The tail-side belt receiving end portion (tail-side knife-edge) 12 is attached through a tail-side mounting plate (edge support) 17 to the other longitudinal end, in other words the rear end with respect to the conveying direction, of the frame portion 13. The belt receiving end portions 11,12 are removably attached to the mounting plates 16,17 respectively, by means of fixtures, such as screws.

Attached to the first-mentioned longitudinal end of the frame portion 13 are a laterally arranged pair of head-side roller supporting members (end hanger) 20, by which a head-side end roller 18 is rotatably supported through a supporting shaft 19. The head-side end roller 18 is positioned below the head-side belt receiving end portion 11, which is in the shape of a horizontal plate. In the same manner as above, a pair of tail-side roller supporting members (end hanger) 23 for supporting a tail-side end roller 21 through a supporting shaft 22 in such a manner that the tail-side end roller 21 is capable of rotating are laterally arranged and attached to the other longitudinal end of the frame portion 13. The tail-side end roller 21 is positioned below the tail-side belt receiving end portion 12, which is in the shape of a horizontal plate.

Furthermore, to a longitudinally intermediate part of the frame portion 13, a driving roller (not shown), a snap roller (not shown), and a return roller (not shown) are rotatably attached respectively through supporting shafts. The driving roller can be rotated by driving power from a motor 25, which serves as a driving source. The motor 25 and the driving roller compose the aforementioned belt driving means 4.

The conveyor belt 2 is wrapped around the head-side belt receiving end portion 11, the tail-side belt receiving end portion 12, the head-side end roller 18, the tail-side end roller 21, the driving roller, the snap roller, and the return roller in the state where a desired tensile force is applied to the conveyor belt 2. Rotation of the driving roller by operation of the motor 25 of the belt driving means 4 circulates the conveyor belt 2 in a predetermined direction. As a result, the workpieces W on the conveying surface 7 are conveyed in the conveying direction.

Figure 4:
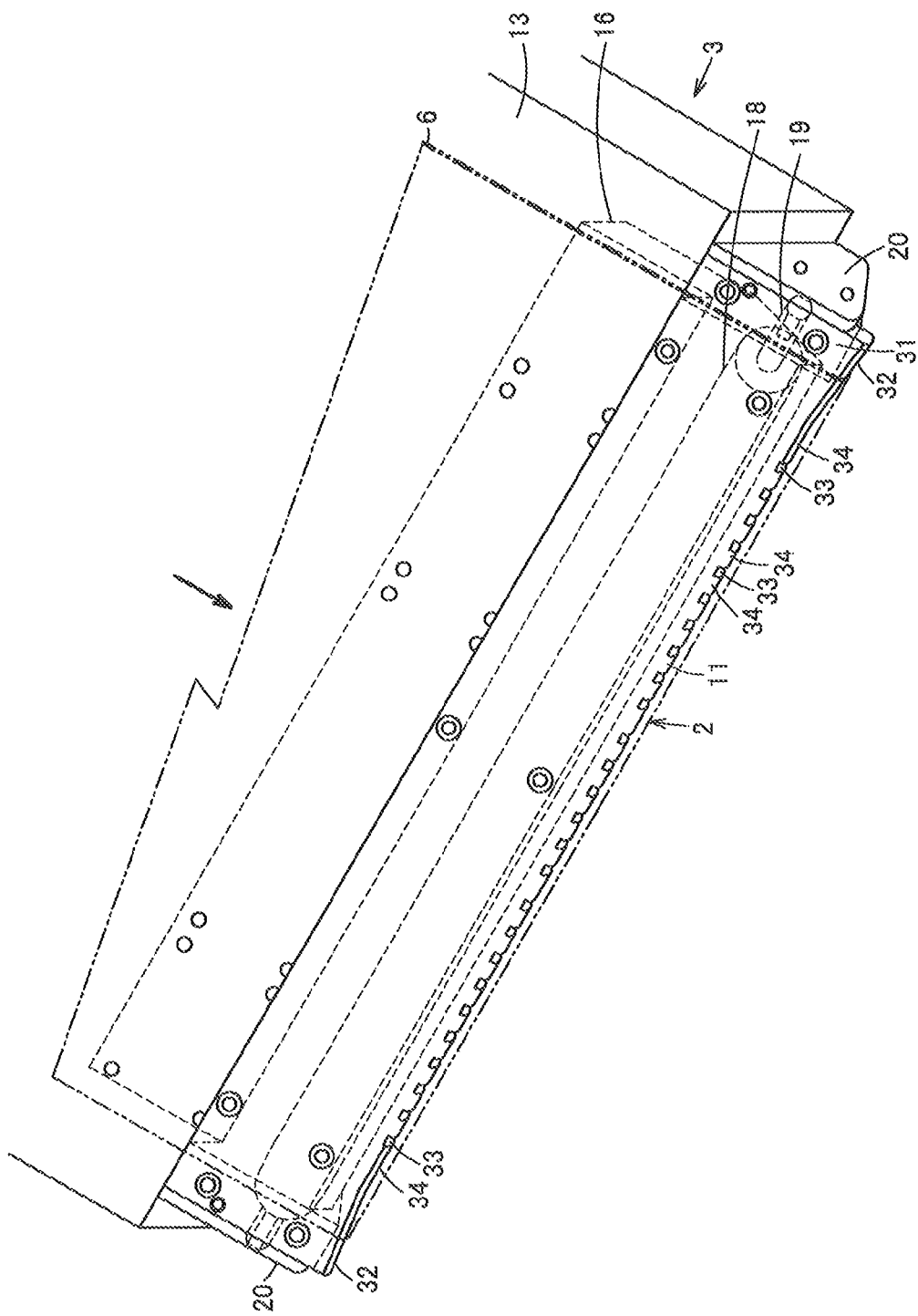
FIG. 4 is a perspective view of a head-side end portion of the belt conveyor.
Figure 5:
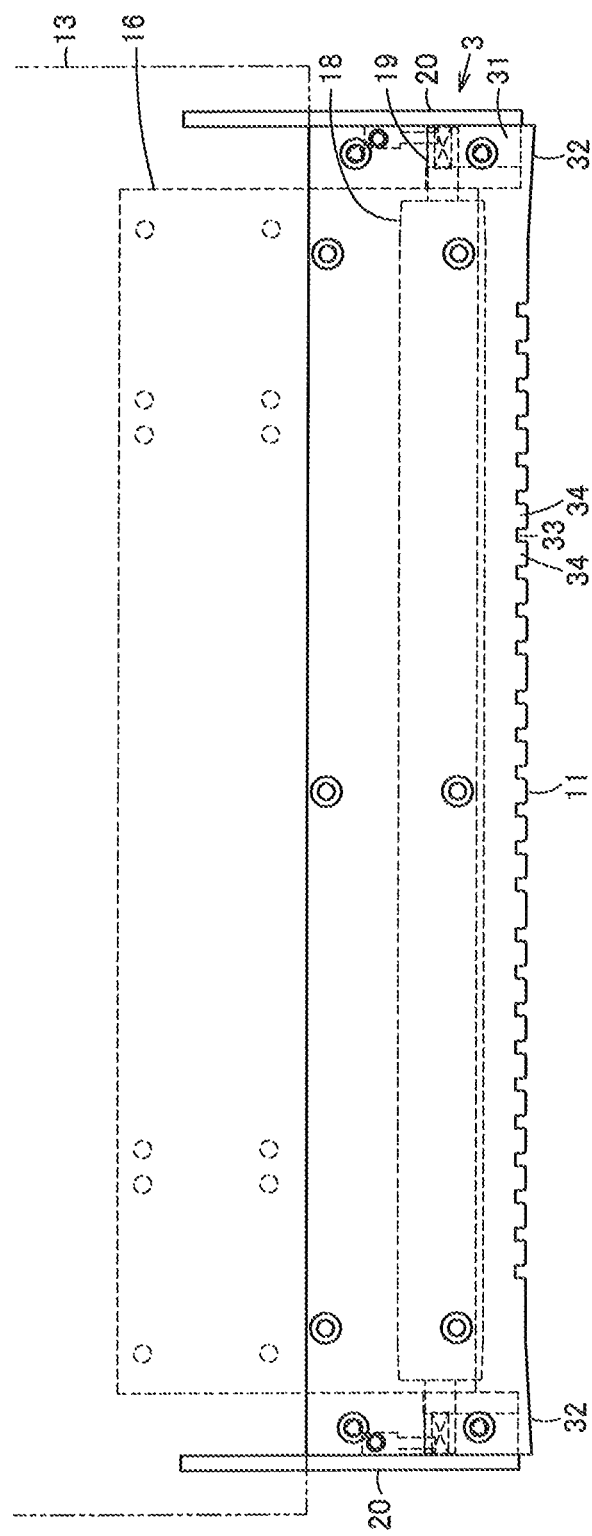
FIG. 5 is a plan view of the head-side end portion of the belt conveyor.

As shown in FIGS. 1, 4, 5, etc., the head-side belt receiving end portion 11 may, for example, be composed solely of a long, single plate-shaped member (single panel) 31. The plate-shaped member 31 is long in the belt-width direction, which is the direction of the width of the conveyor belt 2 (the direction perpendicular to the conveying direction). Examples of the plate-shaped member include relatively thick plate-shaped members. Furthermore, the longitudinal dimension "b" of the head-side belt receiving end portion 11, which is long in the belt-width direction, is longer than the width "a" of the conveyor belt 2.

The head-side belt receiving end portion 11 has projecting portions 32, each of which is provided at the distal end of each respective lateral side of the head-side belt receiving end portion 11. Each projecting portion 32 is a slanted portion outwardly angled with respect to the belt-width direction in such a manner that, in a planar view, the outermost part of the slanted portion is located at the furthest forward position with respect to the conveying direction. The projecting portions 32 are not necessarily slanted at a constant angle.

Of the distal end (the forward end with respect to the conveying direction) of the head-side belt receiving end portion 11, the portion between the right and left projecting portions 32 is provided with a plurality of recess portions 33. The recess portions 33 are formed in the aforementioned portion between the projecting portions 32 in such a manner as to be spaced apart and arranged in the belt-width direction (the direction perpendicular to the conveying direction), and are not in contact with the conveyor belt 2.

To be more specific, the portion between the two projecting portions 32 of the distal end of the head-side belt receiving end portion 11 is composed of the plurality of recess portions (belt clearance portion) 33, which are in a non-contact state with the belt (the state in which they are not in contact with the reverse surface of the conveyor belt 2), and a plurality of protruding portions (belt receiving portions) 34, which are in a contact state with the belt (the state in which they are in sliding contact with the reverse surface of the conveyor belt 2). In other words, the recess portions 33 are formed by cutting out the end face of the head-side belt receiving end portion 11 so as to open forward with respect to the conveying direction (the same direction as the conveying direction), as well as upward and downward so that each recess portion 33 is located between one and an adjacent protruding portions 34.

Figure 6:
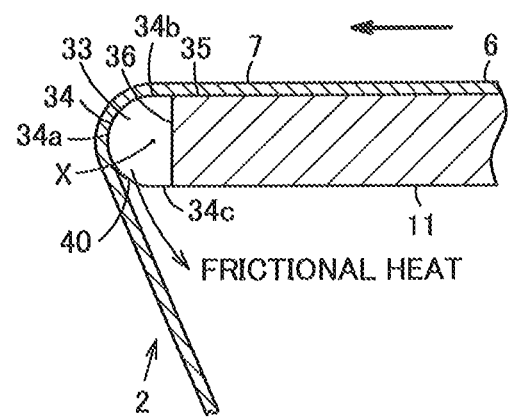
FIG. 6 is a sectional view of a head-side belt receiving end portion of the belt conveyor.

As shown in FIG. 6, each protruding portion 34, which is in contact with the conveyor belt 2, is composed of an arc-shaped curved belt receiving face 34a, a horizontal upper flat belt receiving face 34b, and a horizontal lower flat belt receiving face 34c. The curved belt receiving face 34a of each protruding portion 34 protrudes forward (to the left as viewed in FIG. 6) with respect to the conveying direction in an arc, with a horizontal center axis line X at the center. The upper flat belt receiving face 34b smoothly continues to the upper end of the curved belt receiving face 34a. The lower flat belt receiving face 34c smoothly (but not necessarily smoothly) continues to the lower end of the curved belt receiving face 34a. On the entire upper surface of the head-side belt receiving end portion 11 except for the distal end thereof, a horizontal, flat belt supporting face 35 is formed, and the upper flat belt receiving face 34b smoothly continues to the distal end of the belt supporting face 35.

A vertical, flat belt non-receiving face 36 faces the recess portions 33, which serve as a space portion, and is located behind the center axis line X with respect to the conveying direction. Furthermore, the vertical belt non-receiving face 36 may be located forward of the center axis X. If such is the case, the portion that is in contact with the conveyor belt is chamfered into an R-like shape. The upper end of the belt non-receiving face 36 smoothly continues to the distal end of the belt supporting face 35.

Each recess portion 33 has at the lower end thereof a heat releasing opening 40 for releasing downward frictional heat that is generated by sliding friction between the conveyor belt 2 and the protruding portions 34 at the time when the conveyor belt 2 is circulated. The heat releasing openings 40 are always open downward. In other words, in the state where the conveyor belt 2 is stretched so as to be turned back at the head-side belt receiving end portion 11, the lower end of each recess portion 33 is open because of the heat releasing opening 40, and the distal end and the upper end of each recess portion 33 are covered by the conveyor belt 2. Although frictional heat generated by sliding of the conveyor belt 2 on the protruding portions 34 is released from the recess portions 33 primarily through the heat releasing openings 40 at the bottom of the recess portions 33, the heat is released also from the distal end and the upper end of the recess portions 33 through the conveyor belt 2.

The protruding portion 34 adjacent to each projecting portion 32 is formed so as to smoothly continue to the inner end of each projecting portion 32. The distal end face of each projecting portion 32 is formed in an arc shape protruding forward with respect to the conveying direction so as to continue to the curved belt receiving face 34a of the adjacent protruding portion 34.

Figure 7:
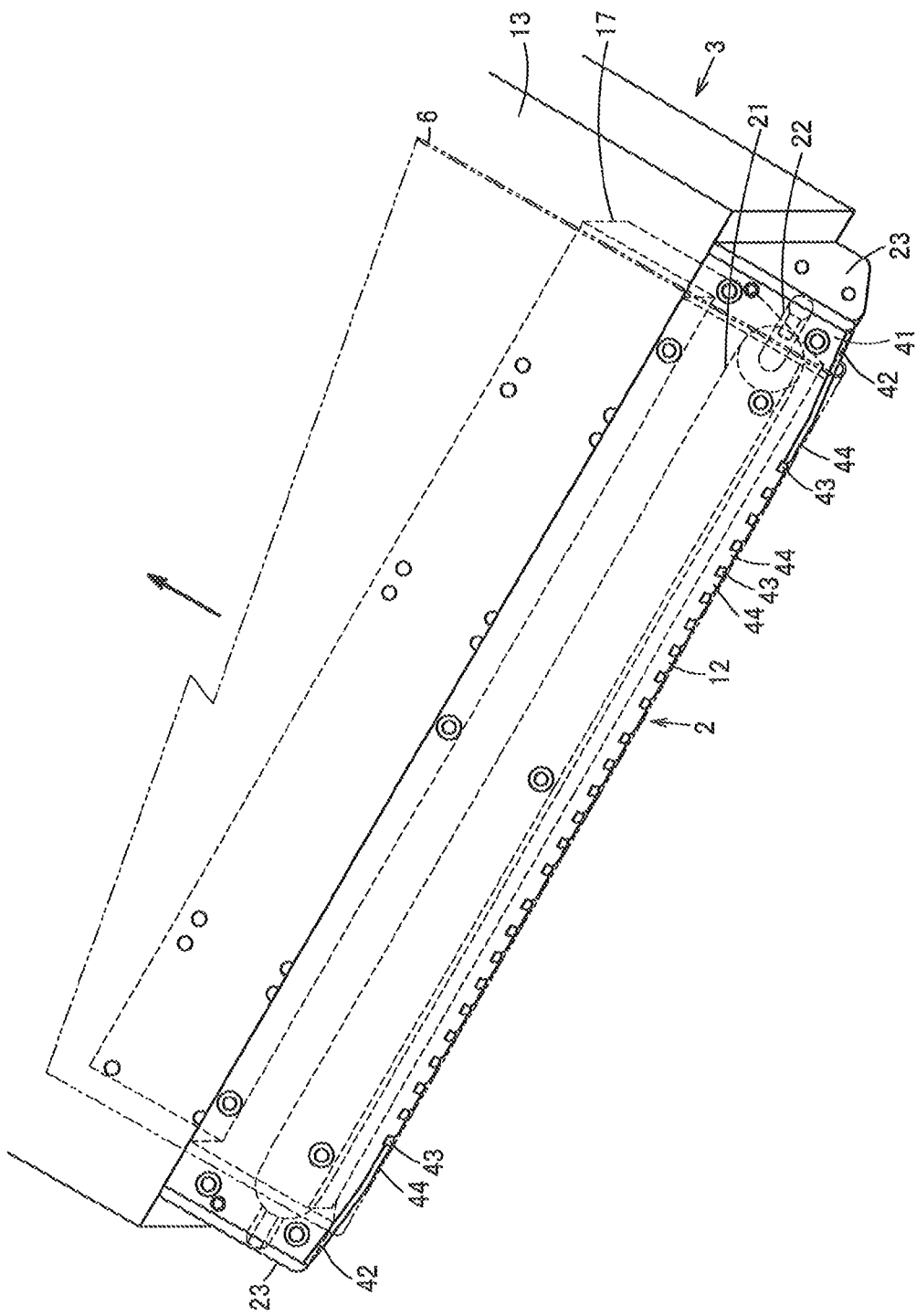
FIG. 7 is a perspective view of a tail-side end portion of the belt conveyor.
Figure 8:
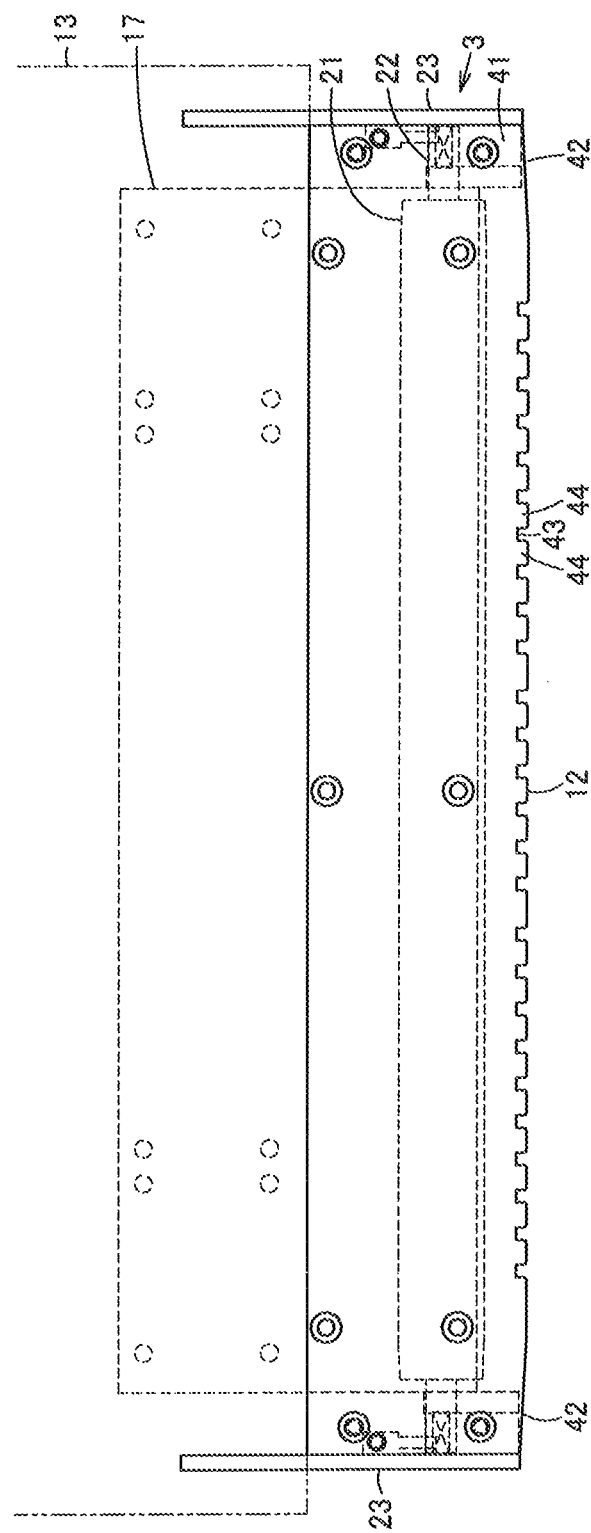
FIG. 8 is a plan view of the tail-side end portion of the belt conveyor.

As shown in FIGS. 1, 7, 8, etc., the tail-side belt receiving end portion 12 may, for example, be composed solely of a long, single plate-shaped member (single panel) 41. The plate-shaped member 41 is long in the belt-width direction, which is the direction of the width of the conveyor belt 2 (the direction perpendicular to the conveying direction). Examples of the plate-shaped member 41 include relatively thick plate-shaped members.

Furthermore, the longitudinal dimension "c" of the tail-side belt receiving end portion 12, which is long in the belt-width direction, is equal to the longitudinal dimension "b" of the head-side belt receiving end portion 11 (b=c) and longer than the width "a" of the conveyor belt 2. Furthermore, b≠c is also acceptable; for example, a structure wherein the longitudinal dimension "c" of the tail-side belt receiving end portion 12 is shorter than the longitudinal dimension "b" of the head-side belt receiving end portion 11 is also acceptable.

The tail-side belt receiving end portion 12 has inwardly slanted portions (inclined portions) 42, each of which is provided at the distal end of each respective lateral side of the tail-side belt receiving end portion 12. Each inwardly slanted portion 42 is a slanted portion angled with respect to the belt-width direction in such a manner that, in a planar view, the outermost part of the slanted portion is located at the furthest forward position with respect to the conveying direction. Furthermore, the inclination angle β of each inwardly slanted portion 42 with respect to the belt-width direction is approximately same as the inclination angle α of each projecting portion 32 with respect to the belt-width direction.

Of the distal end (the rear end with respect to the conveying direction) of the tail-side belt receiving end portion 12, the portion between the right and left inwardly slanted portions 42 is provided with a plurality of recess portions 43. The recess portions 43 are formed in the aforementioned portion between the inwardly slanted portions 42 in such a manner as to be spaced apart and arranged in the belt-width direction (the direction perpendicular to the conveying direction), and are not in contact with the conveyor belt 2.

To be more specific, the portion between the two inwardly slanted portions 42 of the distal end of the tail-side belt receiving end portion 12 is composed of the plurality of recess portions (belt clearance portion) 43, which are in a non-contact state with the belt (the state in which they are not in contact with the reverse surface of the conveyor belt 2), and a plurality of protruding portions (belt receiving portions) 44, which are in a contact state with the belt (the state in which they are in sliding contact with the reverse surface of the conveyor belt 2). In other words, the recess portions 43 are formed by cutting out the end face of the tail-side belt receiving end portion 12 so as to open rearward with respect to the conveying direction (the opposite direction of the conveying direction), as well as upward and downward so that each recess portion 43 is located between one and an adjacent protruding portions 44.

Figure 9:
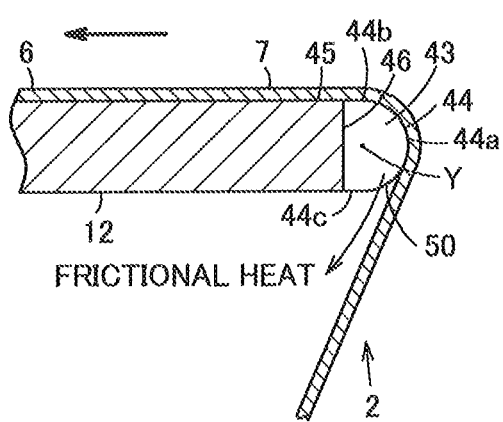
FIG. 9 is a sectional view of a tail-side belt receiving end portion of the belt conveyor.
Figure 10:
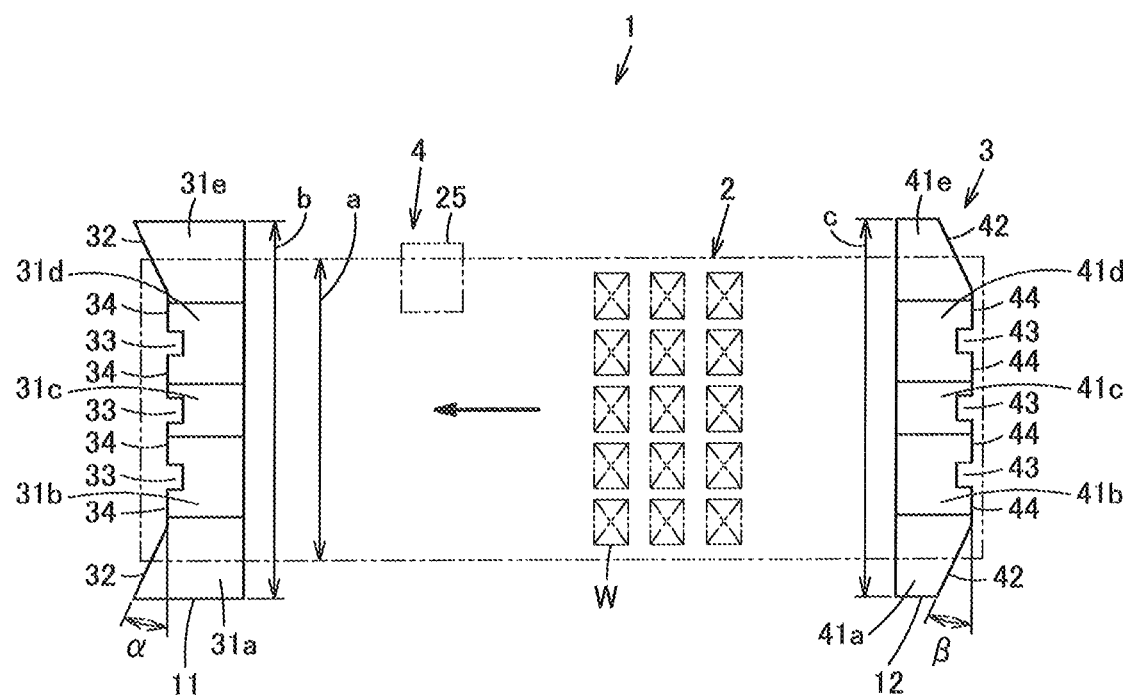
FIG. 10 is a schematic plan view of a belt conveyor according to a second embodiment of the present invention.
Figure 11:
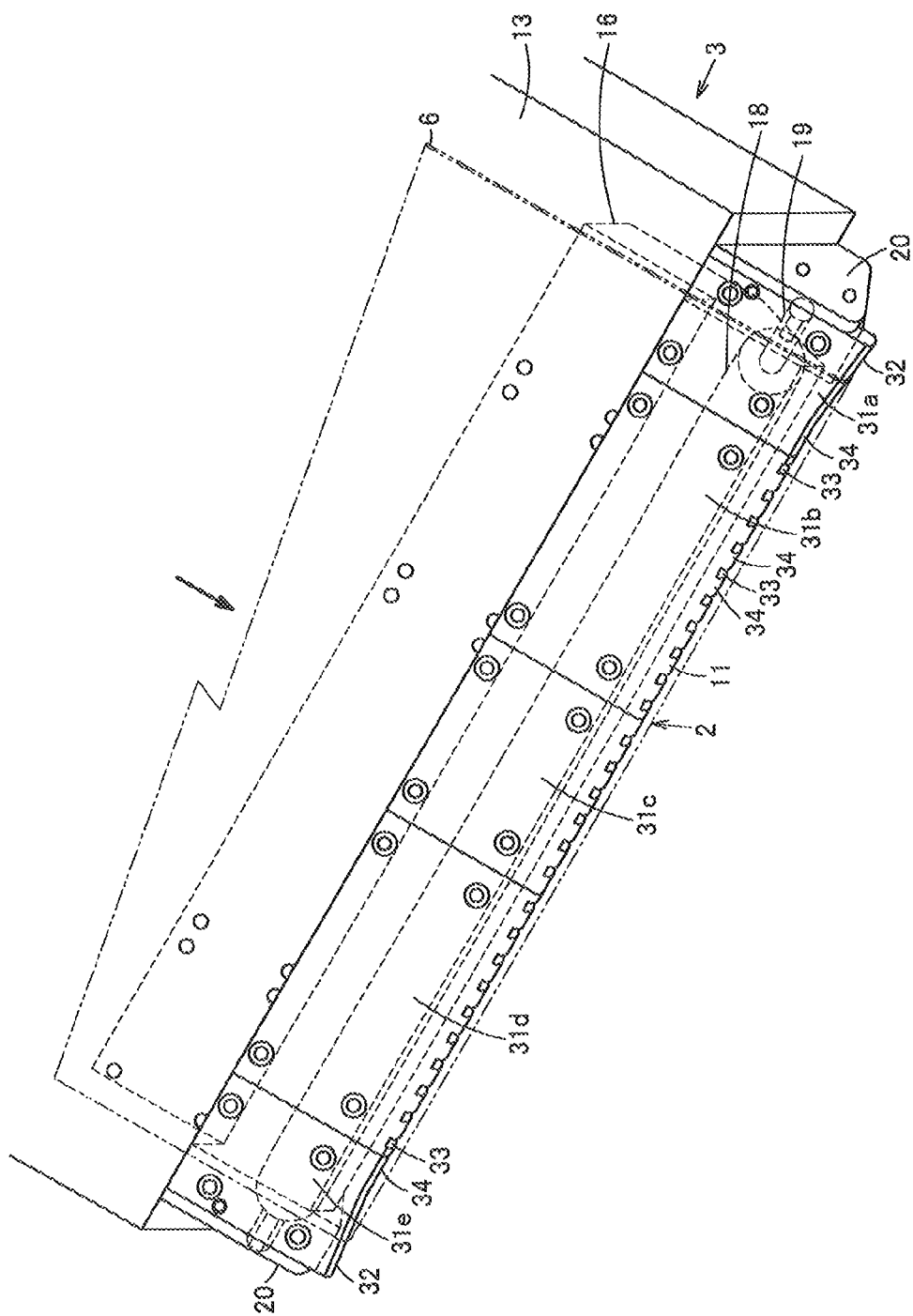
FIG. 11 is a perspective view of a head-side end portion of the belt conveyor.
Figure 12:
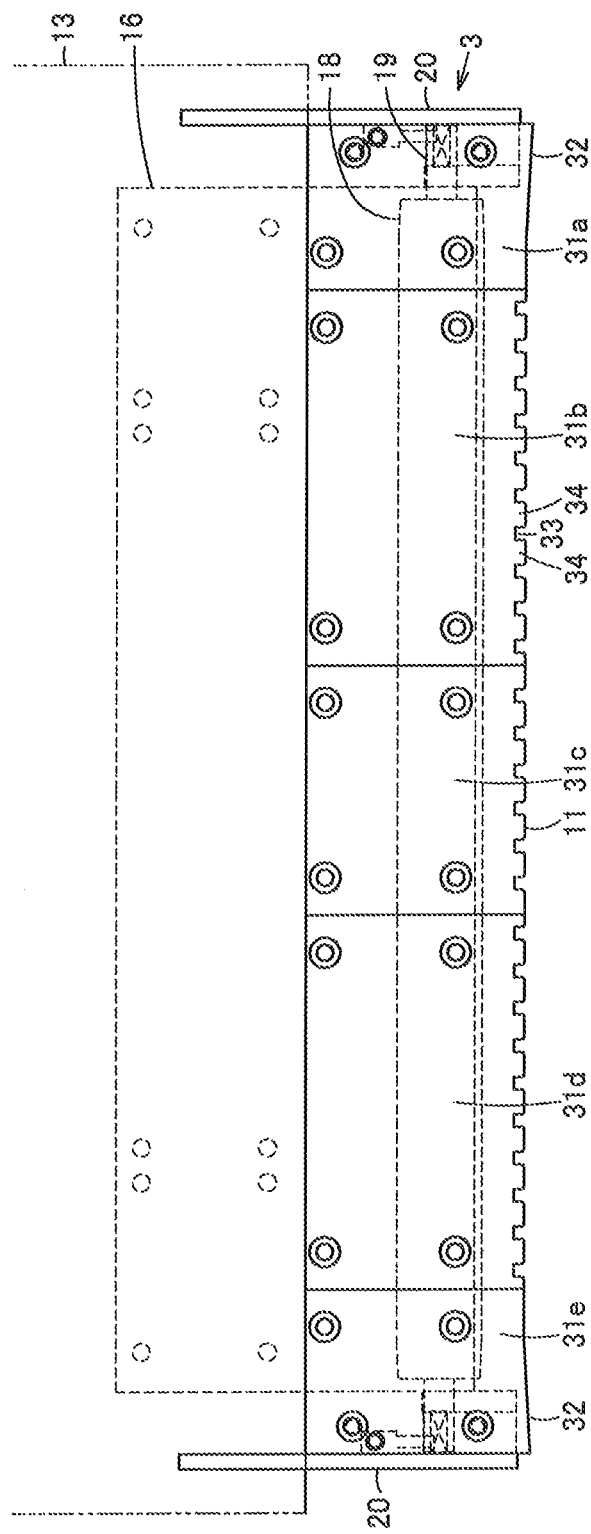
FIG. 12 is a plan view of the head-side end portion of the belt conveyor.
Figure 13:
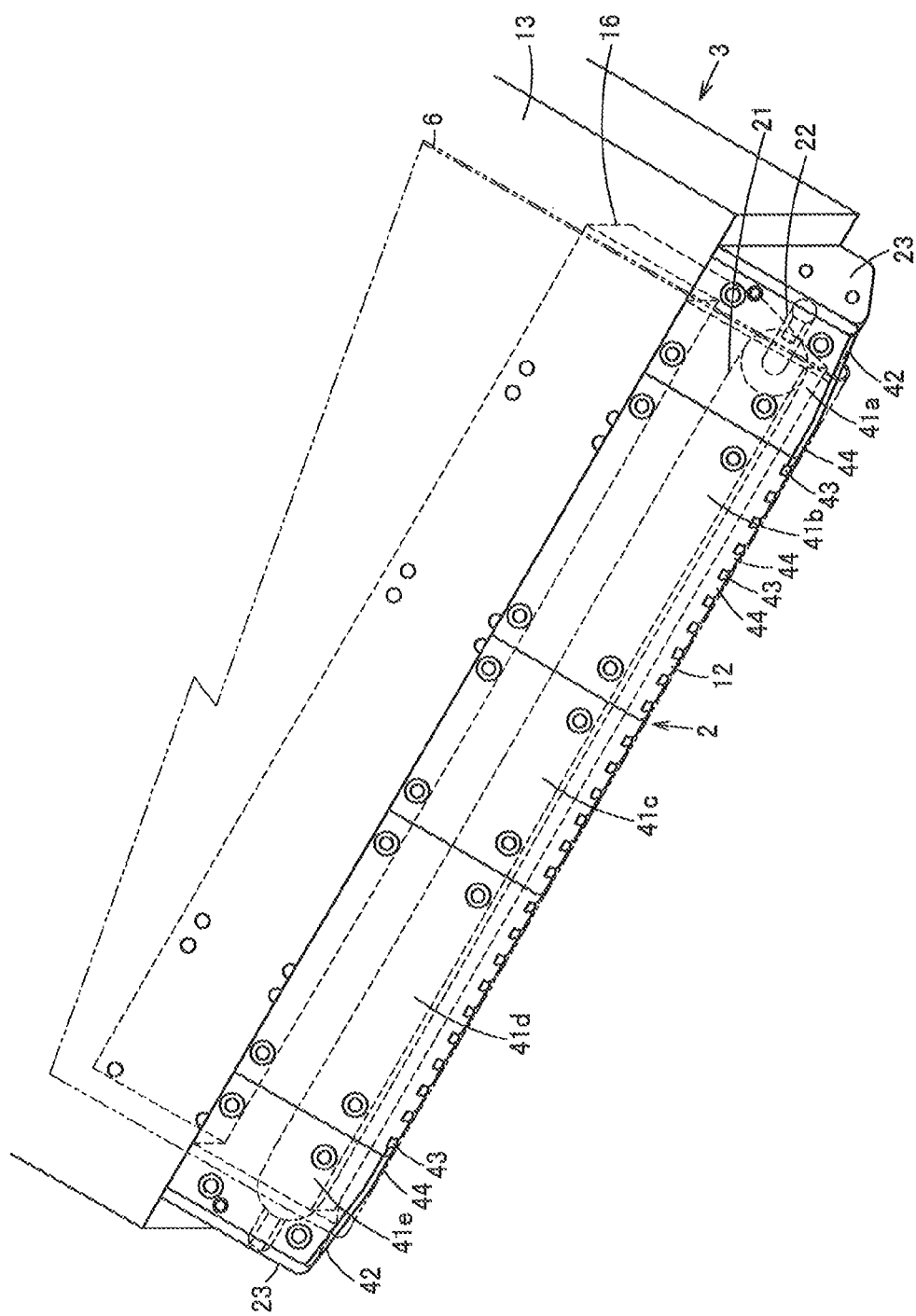
FIG. 13 is a perspective view of a tail-side end portion of the belt conveyor.
Figure 14:
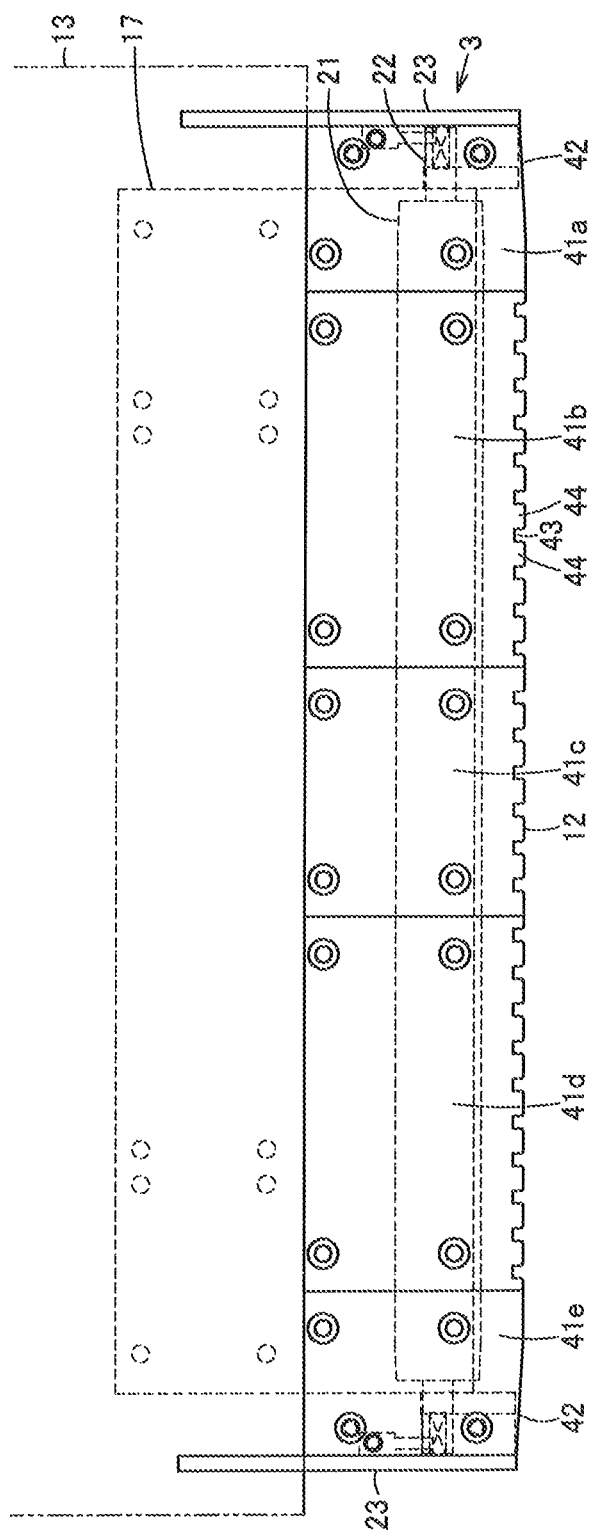
FIG. 14 is a plan view of the tail-side end portion of the belt conveyor.

As shown in FIG. 9, each protruding portion 44, which is in contact with the conveyor belt 2, is composed of an arc-shaped curved belt receiving face 44a, a horizontal upper flat belt receiving face 44b, and a horizontal lower flat belt receiving face 44c. The curved belt receiving face 44a of each protruding portion 44 protrudes rearward (to the right as viewed in FIG. 9) with respect to the conveying direction in an arc with a horizontal center axis line Y at the center. The upper flat belt receiving face 44b smoothly continues to the upper end of the curved belt receiving face 44a. The lower flat belt receiving face 44c smoothly (but not necessarily smoothly) continues to the lower end of the curved belt receiving face 44a. On the entire upper surface of the tail-side belt receiving end portion 12 except for the distal end thereof, a horizontal, flat belt supporting face 45 is formed, and the upper flat belt receiving face 44b smoothly continues to the distal end of the belt supporting face 45.

A vertical, flat belt non-receiving face 46 faces the recess portions 43, which serve as a space portion, and is located forward of the center axis line Y with respect to the conveying direction. Furthermore, the vertical belt non-receiving face 46 may be located rearward of the center axis Y. If such is the case, the portion that is in contact with the conveyor belt is chamfered into an R-like shape. The upper end of the belt non-receiving face 46 smoothly continues to the distal end of the belt supporting face 45.

Each recess portion 43 has at the lower end thereof a heat releasing opening 50 for releasing downward frictional heat that is generated by sliding friction between the conveyor belt 2 and the recess portions 44 at the time when the conveyor belt 2 is circulated. The heat releasing openings 50 are always open downward. In other words, in the state where the conveyor belt 2 is stretched so as to be turned back at the tail-side belt receiving end portion 12, the lower end of each recess portion 43 is open because of the heat releasing opening 50, and the distal end and the upper end of each recess portion 43 are covered by the conveyor belt 2. Although frictional heat generated by sliding of the conveyor belt 2 on the protruding portions 44 is released from the recess portions 43 primarily through the heat releasing openings 50 at the bottom of the recess portions 43, the heat is released also from the distal end and the upper end of the recess portions 43 through the conveyor belt 2.

The protruding portion 44 adjacent to each projecting portion 42 is formed so as to smoothly continue to the inner end of each inwardly slanted portion 42. The distal end face of each inwardly slanted portion 42 is formed in an arc shape protruding rearward with respect to the conveying direction so as to continue to the curved belt receiving face 44a of the adjacent protruding portion 44.

The protruding portions 34 or 44 that are too narrow in width may damage the conveyor belt 2. Furthermore, the recess portions 33 or 43 that are too wide in the width may cause a part of the conveyor belt 2 to drop into the recess portions 33 or 43. Therefore, it is desirable that the ratio of the width of the recess portions 33,43 to the width of the protruding portions 34,44 be in the range, for example, between approximately 1:1 and 1:2.

Furthermore, as is evident from FIG. 1, the distance between the inner end of the two projecting portions 32 is the same as the distance between the inner end of the two inwardly slanted portions 42 and is shorter than the width "a" of the conveyor belt 2. Therefore, one of the widthwise ends of the conveyor belt 2 is constantly in sliding contact with the projecting portion 32 and the inwardly slanted portion 42 that are at one side, and the other widthwise end of the conveyor belt 2 is constantly in sliding contact with the projecting portion 32 and the inwardly slanted portion 42 at the other side. In other words, the width "a" of the conveyor belt 2 is set at such a value that a predetermined amount of the right and left sides of the belt is placed on the two projecting portions 32, which are respectively at the right and left sides of the head-side belt receiving end portion 11, and also on the two inwardly slanted portions 42, which are respectively at the right and left sides of the tail-side belt receiving end portion 12.

The width "a" of the conveyor belt 2 is set at such a value that even if the conveyor belt 2 shifts to the furthest extent of the margin for meandering, the edge of the opposite side of the conveyor belt 2 will not come off of the slanted portion (the projecting portion or the inwardly slanted portion) 32 or 42, which is an inclined portion, at the right or left side. The slanted portions 32,34 are not provided with recess portions 33,43.

Next, the functions and other features of the belt conveyor 1 is explained hereunder.

When the driving roller is rotated by operation of the motor 25 of the belt driving means 4, the conveyor belt 2 is circulated in a predetermined direction, thereby conveying workpieces W in the conveying direction.

At that time, of the conveyor belt 2, which is being circulated, the turnaround portion at the forward end with respect to the conveying direction moves (slides) in such a state as to be in close contact with the projecting portions 32 and the protruding portions 34 but not in contact with the recess portions 33. In a similar way, of the conveyor belt 2, which is being circulated, the turnaround portion at the rear end with respect to the conveying direction moves (slides) in such a state as to be in close contact with the inwardly slanted portions 42 and the protruding portions 44 but not in contact with the recess portions 43.

With the belt conveyor 1 described above, the head-side belt receiving end portion 11, which is a fixed plate, has a plurality of recess portions 33, which are arranged in the direction perpendicular to the conveying direction and not in contact with the conveyor belt 2, and the tail-side belt receiving end portion 12, which is a fixed plate, has a plurality of recess portions 43, which are arranged in the direction perpendicular to the conveying direction and not in contact with the conveyor belt 2. As a result of this structure, the area of the surface of the conveyor belt 2 in sliding contact with the belt receiving end portions 11,12 is reduced so that the frictional resistance that the conveyor belt 2 receives from the belt receiving end portions 11,12 is reduced. Therefore, the structure described above is capable of reducing energy consumption by reducing load resistance of the motor 25 of the belt driving means 4, and is also capable of improving the conveying capacity.

Furthermore, the recess portions 33,43 of the belt receiving end portions 11,12 have the heat releasing openings 40,50 so that the frictional heat generated by friction between the conveyor belt 2 and the belt receiving end portions 11,12 is released primarily downward. Therefore, in addition to holding down the generation of frictional heat by reducing the area of slide contact, it is also possible, by means of releasing frictional heat from the heat releasing openings 40,50, to appropriately reduce the increase in temperature at the frictional surface between the turnaround portions of the conveyor belt 2 and the distal end portions of the belt receiving end portions 11,12.

Therefore, in cases where the workpieces W are, for example, chocolate, the workpieces W are not prone to melt or deform due to heat and can be appropriately conveyed, because the increase in temperature of the conveyor belt 2 can be reduced. Moreover, the reduction in temperature of the frictional surface of the conveyor belt 2 contributes to increasing the life span of the endless portion (the portion where the ends of the strip member for the belt are joined) of the conveyor belt 2.

Of particular note is that the heat releasing openings 40,50 of the recess portions 33,43 are constantly open downward. As a result, circulation (travel) of the conveyor belt 2 generates a flow of the air so that the air flows out of and into the heat releasing openings 40,50. In other words, the structure described above enables effective release of frictional heat.

Furthermore, measuring the temperature in the proximity of the head-side belt receiving end portion 11 when the belt conveyor 1 was running at a speed of 20 m/min. in an atmospheric temperature of 21° C., an increase of the temperature by 3 to 4° C. occurred. On the other hand, with a conventional structure that was not provided with recess portions 33,43, an increase of the temperature by 8 to 9° C. occurred. It was thus confirmed that a difference of approximately 5° C. in increase of temperature would result depending on whether or not there are recess portions 33,43. Furthermore, the more the belt speed increases or the greater the tension ratio, or depending on such other variables as the structure of the belt core, the temperature of the belt receiving portions tends to increase.

The head-side belt receiving end portion 11 is composed of a single plate-shaped member 31, and the tail-side belt receiving end portion 12 is composed of a single plate-shaped member 41. Therefore, the invention described above is capable of providing a simple structure with a small number of parts.

The head-side belt receiving end portion 11 is provided at the distal end of each respective lateral side thereof with a projecting portion 32 that is outwardly angled in such a manner that, in a planar view, the outermost part of the projecting portion 32 is located at the furthest forward position with respect to the conveying direction. The tail-side belt receiving end portion 12 is provided at the distal end of each respective lateral side thereof with an inwardly slanted portion 42 that is angled in such a manner that, in a planar view, the outermost part of the inwardly slanted portion 42 is located at the furthest forward position with respect to the conveying direction. Therefore, the structure described above is capable of preventing meandering of the conveyor belt 2 and also preventing excessive tensile force from being applied to the two sides of the conveyor belt 2, thereby improving durability of the conveyor belt 2.

In other words, the embodiment described above has a structure such that the head-side belt receiving end portion is formed in a trough shape; the tail-side belt receiving end portion 12 is formed in a chevron shape; and that the conveyor belt 2 with a predetermined width "a" is wrapped around these belt receiving end portions 11,12. As a result, should the conveyor belt 2 meander, the head-side of the belt edge at the meandering side of the belt moves onto the projecting portion 32 at the meandering side, while the tail-side of the belt edge gradually moves along the inwardly slanted portion 42 at the meandering side in the conveying direction so that the tensile force between the head-side and the tail-side is cancelled out. Therefore, as an excessive tensile force is not prone to be applied to the conveyor belt 2, frictional resistance at the knife-edge end becomes small, resulting in a reduced load to the motor 25. It is also possible, for example, to prevent the problem of fatigue of the fabric portion (core body) of the conveyor belt 2 from occurring due to excessive load, which would otherwise cause one side of the conveyor belt 2 to stretch and lose flexibility. In addition, it is also possible to mitigate such defects as fatigue of the resin coating portion of the conveyor belt 2 and cracks generated on the surface thereof caused by the stretching and shrinking of the resin coating portion. Given that the ratio between the tensile forces at the respective lateral sides of the conveyor belt 2 (A:B) is equal to the ratio between the meandering restoration forces at the respective lateral sides of the conveyor belt 2, even if a tensile force is applied to only one side of the conveyor belt 2, the opposite side is still on the slanted portions (the projecting portions and the inwardly slanted portion) 32,42. The tensile forces at the respective lateral sides of the conveyor belt 2, which are equal to the ratio between the meandering restoration forces at the respective lateral sides of the conveyor belt 2, are expressed as the ratio A:B. As this ratio never becomes 0, the conveyor belt 2 according to the invention has superior stability with regard to meandering compared with conventional structures. For example, in case of a belt conveyor with a long machine body with respect to the belt width (machine body length≥belt width×2) or a belt conveyor with the same machine body length as the belt width, too, stability with regard to meandering can be ensured.

Furthermore, the surfaces (the frictional surface) of the conveyor belt 2 in sliding contact with the belt receiving end portions 11,12 are composed of flat surfaces and smooth, curved surfaces so that no portion at which the conveyor belt 2 is in sliding contact with either of the belt receiving end portions 11,12 has a corner. Therefore, the structure described above is capable of appropriately reducing frictional resistance applied to the conveyor belt 2, as well as preventing damages to the conveyor belt 2, which would otherwise be caused by the conveyor belt 2 getting caught by the belt receiving end portions 11,12.

A second embodiment of the present invention is explained hereunder, referring to FIGS. 10 to 14.

With a belt conveyor 1 according to the second embodiment of the present invention, the head-side belt receiving end portion 11 is composed of a plurality of plate-shaped members (divided panels) (for example, five plate-shaped members 31a,31b,31c,31d,31e) that are arranged adjacent to one another in a direction perpendicular to the conveying direction. The plate-shaped members 31a,31b,31c,31d,31e can be removably and individually attached to the head-side mounting plate 16. In the same manner as above, the tail-side belt receiving end portion 12 is composed of a plurality of plate-shaped members (divided panels) (for example, five plate-shaped members 41a,41b,41c,41d,41e) that are arranged adjacent to one another in a direction perpendicular to the conveying direction. The plate-shaped members 41a,41b, 41c,41d,41e can be removably and individually attached to the tail-side mounting plate 17.

The plate-shaped members 31a,31e at the respective lateral sides are in such a shape that the two plate-shaped members 31a,31e are bilaterally symmetric with each other, with each plate-shaped member having a projecting portion 32. The plate-shaped members 31b,31d are in such a shape as to be bilaterally symmetric with each other, with each plate-shaped member having a recess portion 33 and protruding portions 34. The plate-shaped member 31c at the center is located between the two plate-shaped members 31b,31d and has a recess portion 33 and protruding portions 34. The plate-shaped members 31b,31d may be bilaterally asymmetric with each other.

In the same manner as above, the plate-shaped members 41a,41e at the respective lateral sides are in such a shape that the two plate-shaped members 41a,41e are bilaterally symmetric with each other, with each plate-shaped member having an inwardly slanted portion 42. The plate-shaped members 41b,41d are in such a shape as to be bilaterally symmetric with each other, with each plate-shaped member having a recess portion 43 and protruding portions 44. The plate-shaped member 41c at the center is located between the two plate-shaped members 41b,41d and has a recess portion 43 and protruding portions 44. The plate-shaped members 41b, 41d may be bilaterally asymmetric with each other.

For example, standardization of parts is possible by using plate-shaped members 31b,31d,41b,41d that have an identical shape, as well as plate-shaped members 31c,41c that have an identical shape. The other elements of the second embodiment are the same as those of the first embodiment described above.

With the belt conveyor 1 according to the second embodiment described above, it is easy to respond to a change in the width "a" of the conveyor belt 2 by changing the number of the plate-shaped members 31b,31c,31d of the head-side belt receiving end portion 11 as well as the number of the plate-shaped members 41b,41c,41d of the tail-side belt receiving end portion 12. In other words, the belt conveyor 1 according to the second embodiment has superior mass productivity, because a combination of belt receiving end portions 11,12 that is appropriate for the width of the conveyor belt 2 can be formed by dividing plate-shaped belt receiving end portions 11,12 in the widthwise direction of the belt.

Figure 15:
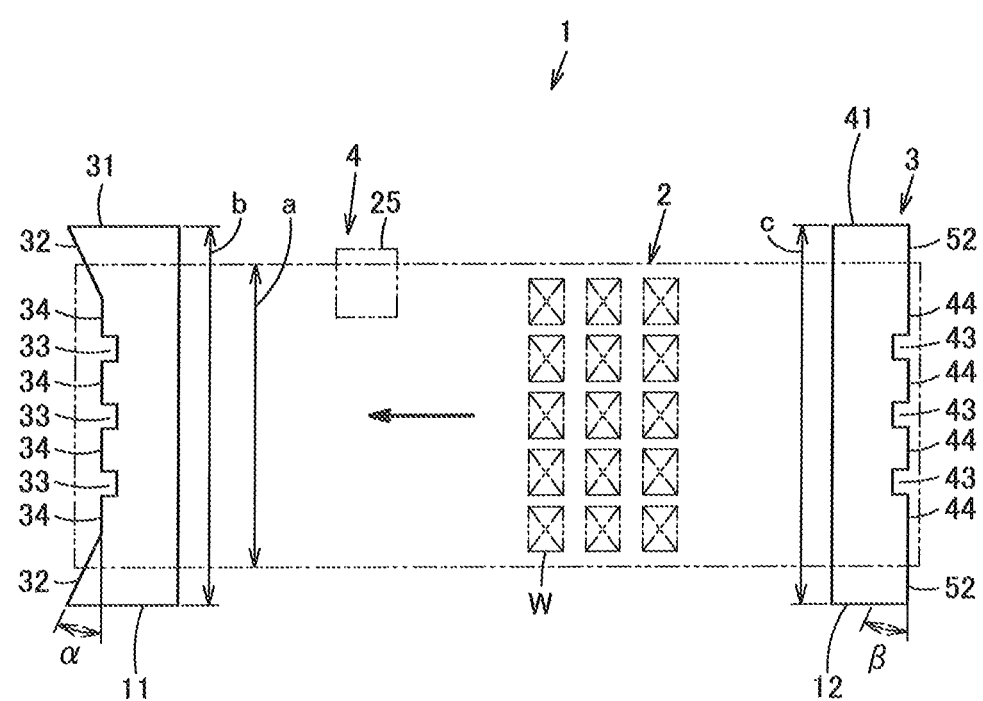
FIG. 15 is a schematic plan view of a belt conveyor according to a third embodiment of the present invention.
Figure 16:
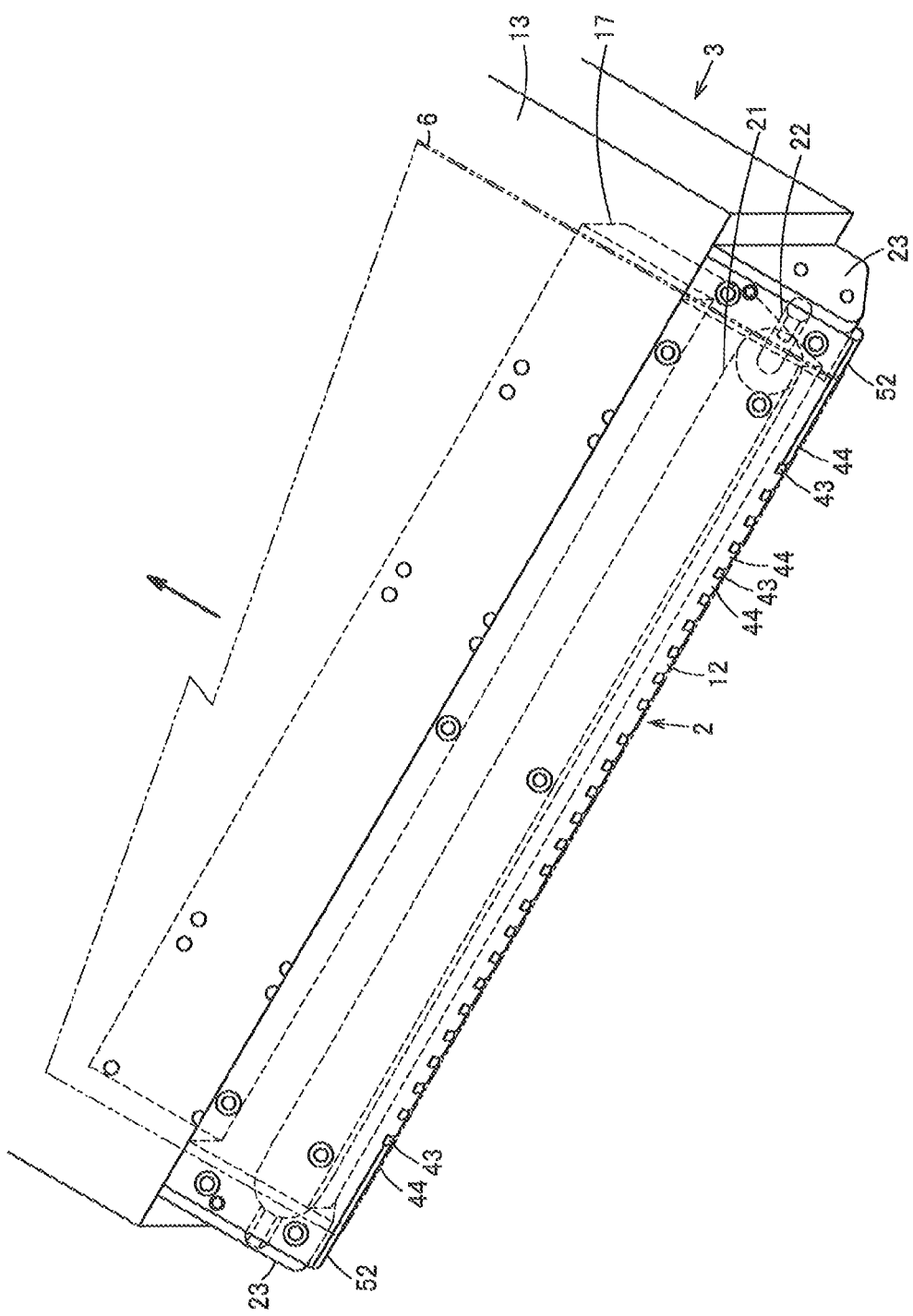
FIG. 16 is a perspective view of a tail-side end portion of the belt conveyor.

A third embodiment of the present invention is explained hereunder, referring to FIGS. 15 and 16.

With a belt conveyor 1 according to the third embodiment of the present invention, the tail-side belt receiving end portion 12 has, at the end of each lateral side thereof with respect to the conveying direction, a straight portion 52 in place of the inwardly slanted portion 42. Each straight portion 52 extends straight in a direction perpendicular to the conveying direction in a planar view.

The protruding portion 44 adjacent to each projecting portion 42 is formed so as to smoothly continue to the inner end of each straight portion 52. The distal end face of each straight portion 52 is formed in an arc shape protruding rearward with respect to the conveying direction so as to continue to the curved belt receiving face 44a of the adjacent protruding portion 44. The other elements of the third embodiment are the same as those of the first embodiment described above.

The belt conveyor 1 according to the third embodiment of the invention, too, is capable of preventing meandering of the conveyor belt 2 and also reducing excessive tensile force from being applied to the conveyor belt 2, thereby improving durability of the conveyor belt 2.

Figure 17:
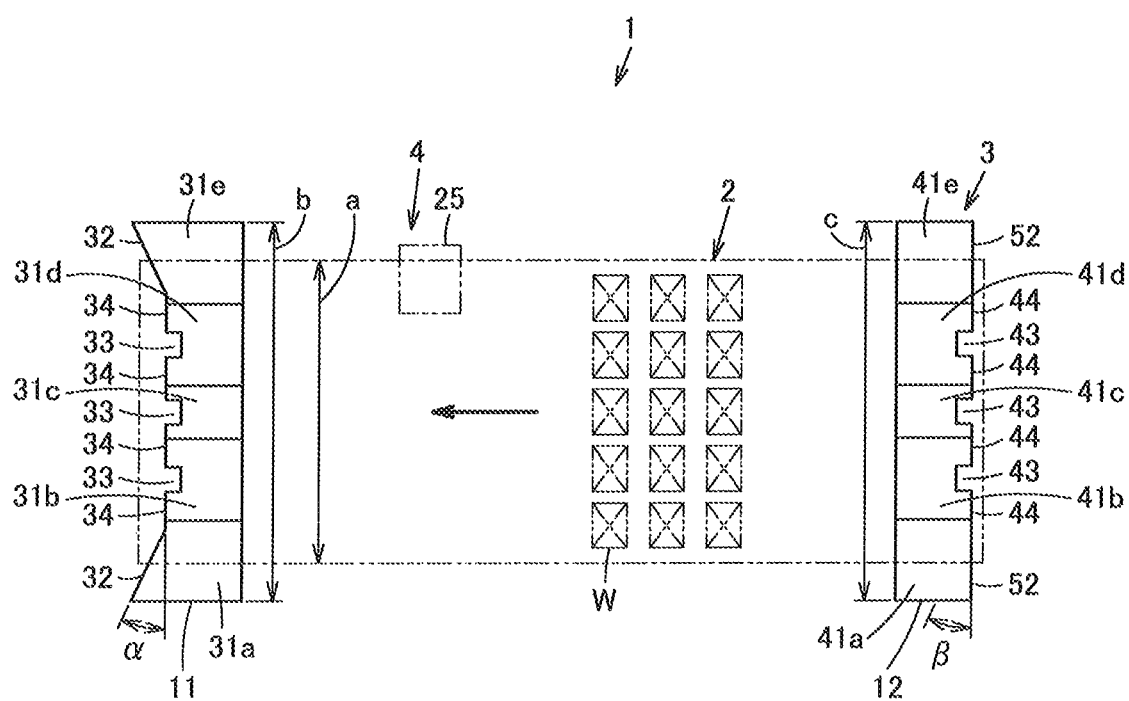
FIG. 17 is a schematic plan view of a belt conveyor according to a fourth embodiment of the present invention.
Figure 18:
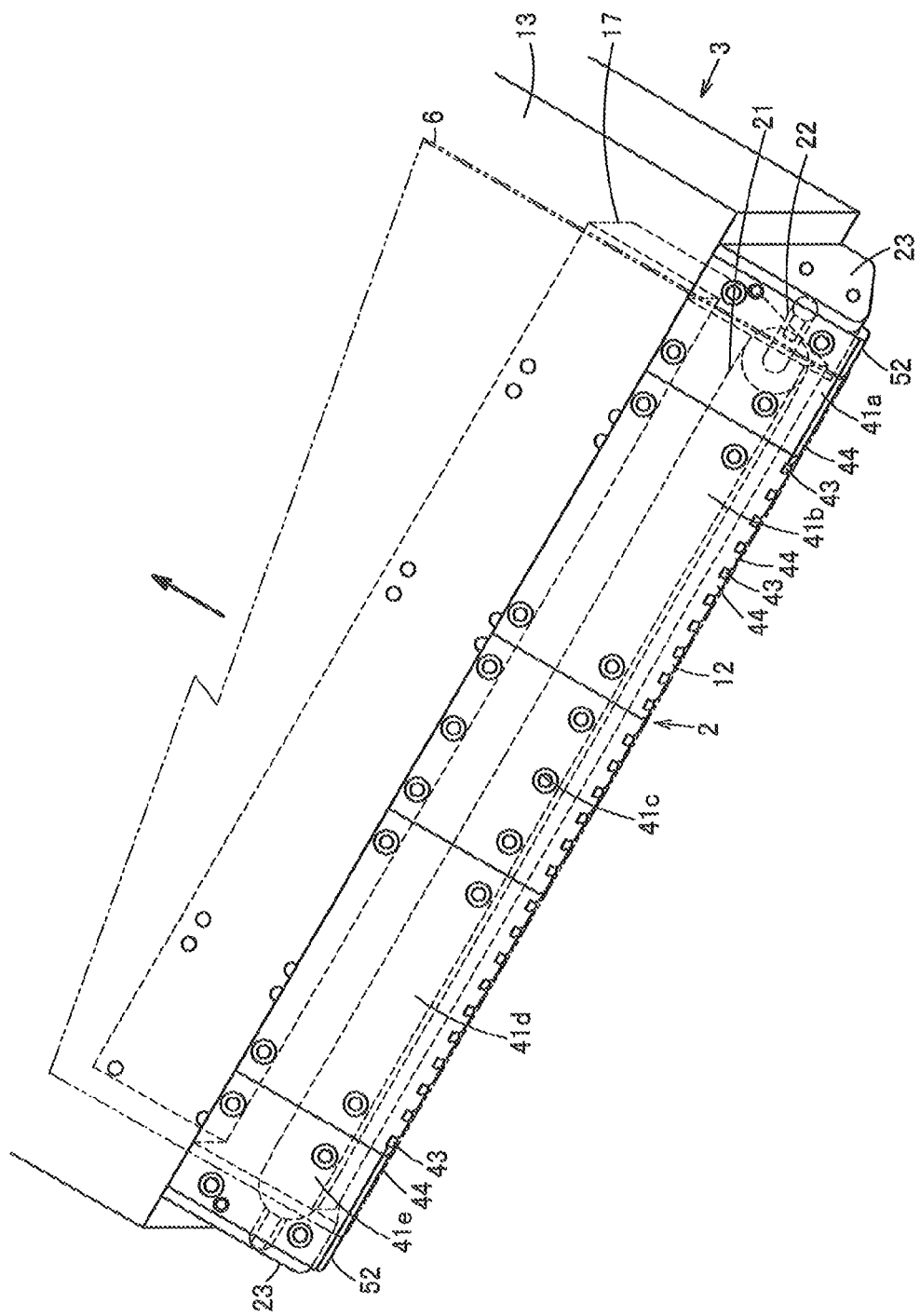
FIG. 18 is a perspective view of a tail-side end portion of the belt conveyor.

A fourth embodiment of the present invention is explained hereunder, referring to FIGS. 17 and 18.

With a belt conveyor 1 according to the fourth embodiment of the present invention, the tail-side belt receiving end portion 12 has, at the end of each lateral side thereof with respect to the conveying direction, a straight portion 52 in place of the inwardly slanted portion 42. Each straight portion 52 extends straight in a direction perpendicular to the conveying direction in a planar view.

The protruding portion 44 adjacent to each projecting portion 42 is formed so as to smoothly continue to the inner end of each straight portion 52. The distal end face of each straight portion 52 is formed in an arc shape protruding rearward with respect to the conveying direction so as to continue to the curved belt receiving face 44a of the adjacent protruding portion 44. The other elements of the fourth embodiment are the same as those of the second embodiment described above.

The belt conveyor 1 according to the fourth embodiment of the invention, too, is capable of preventing meandering of the conveyor belt 2 and also reducing excessive tensile force from being applied to the conveyor belt 2, thereby improving durability of the conveyor belt 2.

Furthermore, it is also possible to use any one of the structures of the embodiments described above appropriately combined with one or more of the other structures.

In any one of the structures of the embodiments described above, examples of the material of the knife-edge member that constitutes the belt receiving end portions 11,12 include SUS, SS, electroless nickel-plated materials, hard chromium-plated materials, ceramics, ceramic-coated materials, etc.

Furthermore, although it is not shown in the drawings, air injection nozzles may be provided near the belt receiving end portions 11,12 and supply the air to the reverse surface of the conveyor belt 2 in order to reduce frictional heat generated between the conveyor belt 2 and the belt receiving end portions 11,12.

A structure wherein the head-side belt receiving end portion 11 alone is provided with recess portions 33 or wherein the tail-side belt receiving end portion 12 alone is provided with recess portions 43 is also possible.

Furthermore, the number of the recess portions 33,43, which are spaced apart and arranged in the belt-width direction, may be any desired number; for example, an appropriate number of recess portions 33,43 may be provided, depending on various conditions, such as the width of the conveyor belt 2 or the material of the conveyor belt 2.

The shape of the recess portions 33,43 is not limited to a shape that is rectangular in a planar view and semi-circular in a side view. Other shapes are also acceptable.

Figure 19:
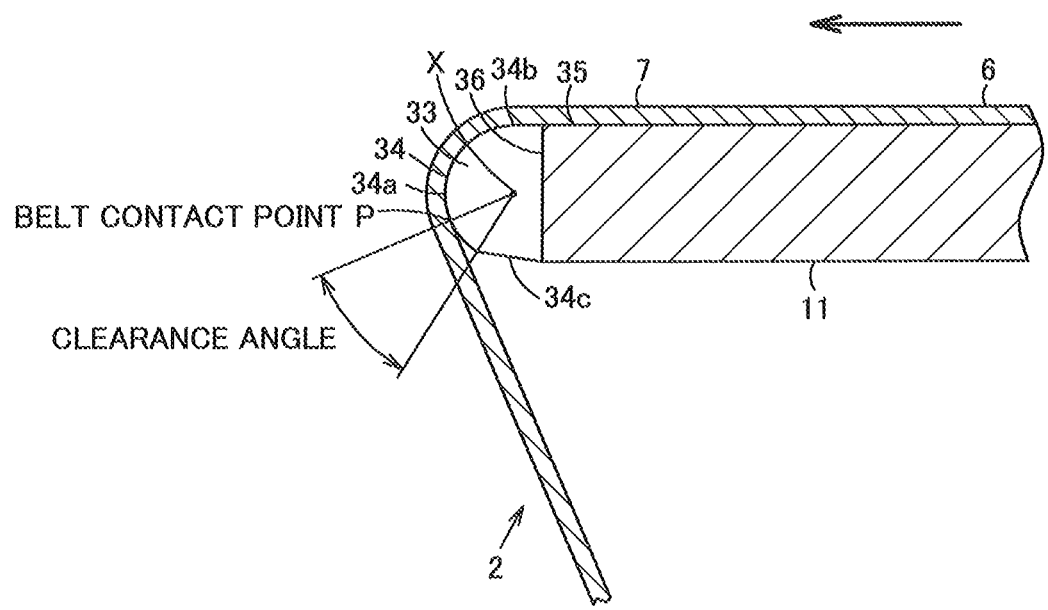
FIG. 19 is an illustration showing a variant of the belt receiving end portion.

Furthermore, each protruding portion 34 at the head-side is not limited to a shape that is composed of the curved belt receiving face 34a, the upper flat belt receiving face 34b, and the lower flat belt receiving face 34c. For example, a structure shown in FIG. 19, wherein each protruding portion 34 includes a slanted belt receiving face 34c that is slightly angled to the horizontal direction, is also acceptable, provided that an angle having sufficient clearance is ensured. Furthermore, although it is not shown in the drawings, the same applies to the protruding portions 44 at the tail-side; a structure wherein each protruding portion 44 includes a slanted belt receiving face 44c that is slightly angled to the horizontal direction is also acceptable, provided that an angle having sufficient clearance is ensured.

Figure 20:
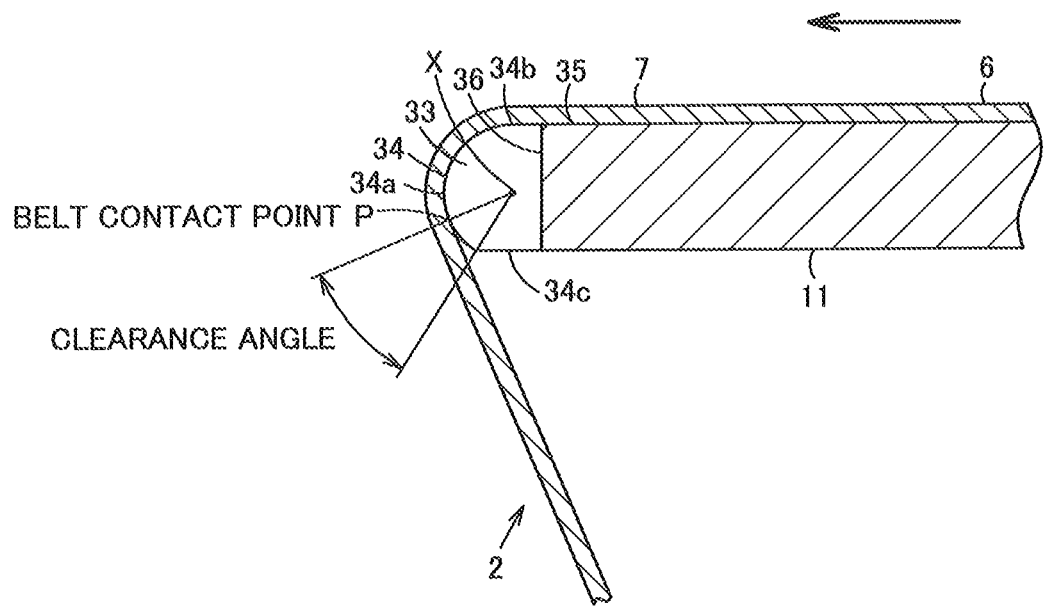
FIG. 20 is an illustration showing another variant of the belt receiving end portion.

Furthermore, a structure that includes such horizontal belt receiving faces 34c at the head-side and horizontal belt receiving faces 44c at the tail-side as those shown in FIG. 20 is also acceptable.

Figure 21:
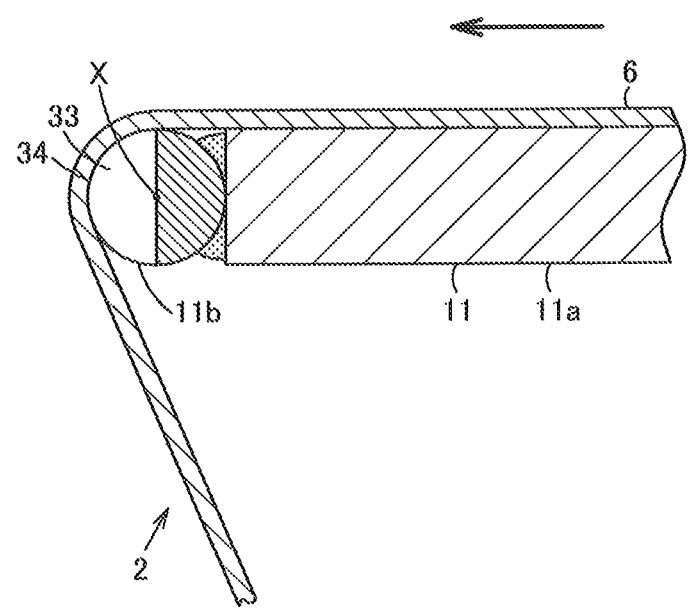
FIG. 21 is an illustration showing yet another variant of the belt receiving end portion.

Yet another example of acceptable structures is shown in FIG. 21, wherein the head-side belt receiving end portion 11 has a plate portion 11a and a round shaft portion 11b, which is fixed to the distal end of the plate portion 11a by welding or other appropriate means. The round shaft portion 11b has a circular cross section with X at the center and is provided with a plurality of recess portions 33 and protruding portions 34. Furthermore, although it is not shown in the drawings, the tail-side belt receiving end portion 12 may have a similar structure.

In any one of the embodiments described above, should no recess portions 33,43 be provided, it is not possible to reduce frictional resistance. Even with such a structure, however, it is possible to prevent meandering of and improve durability of the conveyor belt 2.

Furthermore, a structure wherein the head-side and the tail-side are respectively formed into a knife-edge (a trough shape) and a pulley, and a structure wherein the head-side and the tail-side are respectively formed into a pulley and a knife-edge (a chevron shape) are also acceptable.

INDUSTRIAL APPLICABILITY

The present invention is applicable to belt conveyors that are used, for example, for conveying small objects in a conveying direction.

REFERENCE SIGNS LIST 1 belt conveyor
2 conveyor belt
3 conveyor body
4 belt driving means
11 head-side belt receiving end portion as a belt receiving end portion
12 tail-side belt receiving end portion as a belt receiving end portion
31,31a,31b,31c,31d,31e plate-shaped member
32 projecting portion
33 recess portion
40 heat releasing opening
41,41a,41b,41c,41d,41e plate-shaped member
42 inwardly slanted portion
43 recess portion
50 heat releasing opening
52 straight portion
W workpiece

The invention claimed is:

1. A belt conveyor comprising:
a circulatable endless conveyor belt that conveys a workpiece in a conveying direction;
a conveyor body having two belt receiving end portion that are in sliding contact with the conveyor belt; and
a belt driving unit that circulates the conveyor belt, wherein:
at least one of the belt receiving end portions has a plurality of recess portions that are arranged in a direction perpendicular to the conveying direction, and the conveyor body comprises:
  a head-side belt receiving end portion that serves as one of the belt receiving end portions and is located at the forward end with respect to the conveying direction, and
  a tail-side belt receiving end portion that serves as the other of the belt receiving end portions and is located at the rear end with respect to the conveying direction;
wherein the head-side belt receiving end portion is provided at the distal end of each respective lateral side thereof with a projecting portion that is outwardly angled in such a manner that, in a planar view, the outermost part of the projecting portion is located at the furthest forward position with respect to the conveying direction; and
the tail-side belt receiving end portion is provided at the distal end of each respective lateral side thereof with an inwardly slanted portion that is angled in such a manner that, in a planar view, the outermost part of the inwardly slanted portion is located at the furthest forward position with respect to the conveying direction.

2. A belt conveyor as claimed in claim 1, wherein:
at least one of the belt receiving end portions is comprised of a plurality of plate-shaped members that are arranged in a direction perpendicular to the conveying direction.

3. A belt conveyor comprising:
a circulatable endless conveyor belt that conveys a workpiece in a conveying direction;
a conveyor body having two belt receiving end portions that are in sliding contact with the conveyor belt; and
a belt driving unit that circulates the conveyor belt, wherein:
at least on of the belt receiving end portions has a plurality of recess portions that are arranged in a direction perpendicular to the conveying direction, and is composed of a plurality of plate-shaped members that are arranged in a direction perpendicular to the conveying direction, and
the plurality of plate-shaped members can be removably and individually attached,
wherein the conveyor body comprises:
  a head-side belt receiving end portion that serves as one of the belt receiving end portions and is located at the forward end with respect to the conveying direction, and
  a tail-side belt receiving end portion that serves as the other of the belt receiving end portions and is located at the rear end with respect to the conveying direction;
the head-side belt receiving end portion is provided at the distal end of each respective lateral side thereof with a projecting portion that is outwardly angled in such a manner that, in a planar view, the outermost part of the projecting portion is located at the furthest forward position with respect to the conveying direction; and
the tail-side belt receiving end portion is provided at the distal end of each respective lateral side thereof with an inwardly slanted portion that is angled in such a manner that, in a planar view, the outermost part of the inwardly slanted portion is located at the furthest forward position with respect to the conveying direction.

4. A belt conveyor comprising:
a circulatable endless conveyor belt that conveys a workpiece in a conveying direction;
a conveyor body having two belt receiving end portions that are in sliding contact with the conveyor belt and
a belt driving unit that circulates the conveyor belt, wherein:
at least one of the belt receiving end portions has a plurality of recess portions that are arranged in a direction perpendicular to the conveying direction, and is composed of a plurality of plate-shaped members that are arranged in a direction perpendicular to the conveying direction, and
the plurality of plate-shaped members can be removably and individually attached,
wherein the conveyor body comprises:
  a head-side belt receiving end portion that serves as one of the belt receiving end portions and is located at the forward end with respect to the conveying direction, and a tail-side belt receiving end portion that serves as the other of the belt receiving end portions and is located at the rear end with respect to the conveying direction;

the head-side belt receiving end portion is provided at the distal end of each respective lateral side thereof with a projecting portion that is outwardly angled in such a manner that, in a planar view, the outermost part of the projecting portion is located at the furthest forward position with respect to the conveying direction; and the tail-side belt receiving end portion is provided at the distal end of each respective lateral side thereof with a straight portion extending straight in a direction perpendicular to the conveying direction in a planar view.

* * * * *